J. Raney,
Water Wheel.
No. 107,624.   Patented Sep. 20, 1870.

Witnesses
C. L. Curt
A. R. Mars

Inventor
James Raney
Alexander Mason
Attys.

United States Patent Office.

JAMES RANEY, OF NEWCASTLE, PENNSYLVANIA.

Letters Patent No. 107,624, dated September 20, 1870.

IMPROVEMENT IN WATER-WHEEL CASES.

The Schedule referred to in these Letters Patent and making part of the same.

*To all whom it may concern:*

Be it known that I, JAMES RANEY, of Newcastle, in the county of Lawrence and in the State of Pennsylvania, have invented certain new and useful Improvements in Water-Wheels; and do hereby declare that the following is a full, clear, and exact description thereof, reference being had to the accompanying drawing and to the letters of reference marked thereon making a part of this specification.

The nature of my invention consists in an improvement in the means of applying and operating guiding-gates to the cases of water-wheels, as will be hereinafter fully set forth.

In order to enable others skilled in the art to which my invention appertains to make and use the same, I will now proceed to describe its construction and operation, referring to the annexed drawing, in which—

A represents the casing of a water-wheel, constructed in any of the known and usual ways, and provided with chutes B B.

C is the outside rim, provided with the gates D D, which, when the rim is turned in one direction, close the spaces between the chutes, and when turned in the opposite direction, open the said spaces.

The rim C is, on its upper edge, provided with upward-projecting ears or standards E, on the inner sides of which are placed the rollers G G.

When the rim C is put down in place around the casing, the rollers G G will rest upon the top of the casing near the outer edge, and thus the rim will be suspended by means of said rollers.

The casing may, by means of said rollers, be turned very easy in either direction.

Figure 1:
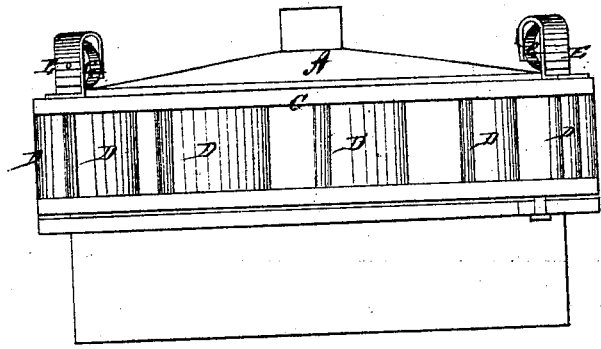
Figure 1 is a side view.
Figure 2:
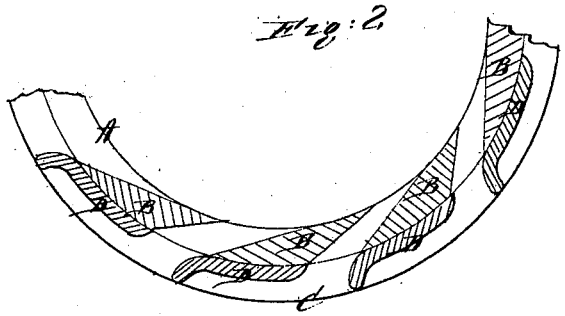
Figure 2 is a horizontal section of a portion of the casing and outside rim and gates.

The outer ends of the gates D D are curved outward, as shown in fig. 2, so that, when shutting the gates, the water will press on the inner sides of said curves, and assist in closing them.

Having thus fully described my invention,

What I claim as new, and desire to secure by Letters Patent, is—

The arrangement, with the casing A, having chutes B B, of the rim C, suspended by the rollers G, and supported by ascending hooks or ears E E, and provided with the outwardly-curved gates D, all constructed to operate substantially as shown and described.

In testimony that I claim the foregoing, I have hereunto set my hand this 21st day of July, 1870.

JAS. RANEY.

Witnesses:
A. N. MARR,
C. M. ALEXANDER.